US012256753B2

(12) United States Patent
Lee et al.

(10) Patent No.: US 12,256,753 B2
(45) Date of Patent: Mar. 25, 2025

(54) METASTABLE, TRANSLUCENT FLAVOR NANOEMULSION AND METHODS OF PREPARING THE SAME

(71) Applicant: INTERNATIONAL FLAVORS & FRAGRANCES INC., New York, NY (US)

(72) Inventors: Daniel Kaiping Lee, Morganville, NJ (US); Chii-Fen Wang, Princeton, NJ (US); Ying Yang, Holmdel, NJ (US); Ronald Gabbard, Farmingdale, NJ (US)

(73) Assignee: INTERNATIONAL FLAVORS & FRAGRANCES INC., New York, NY (US)

( * ) Notice: Subject to any disclaimer, the term of this patent is extended or adjusted under 35 U.S.C. 154(b) by 42 days.

(21) Appl. No.: 15/520,087

(22) PCT Filed: Oct. 20, 2015

(86) PCT No.: PCT/US2015/056396
§ 371 (c)(1),
(2) Date: Apr. 19, 2017

(87) PCT Pub. No.: WO2016/064828
PCT Pub. Date: Apr. 28, 2016

(65) Prior Publication Data
US 2018/0295852 A1 Oct. 18, 2018

Related U.S. Application Data

(60) Provisional application No. 62/197,919, filed on Jul. 28, 2015, provisional application No. 62/065,865, filed on Oct. 20, 2014.

(51) Int. Cl.
A23D 7/01 (2006.01)
A23D 7/005 (2006.01)
A23J 7/00 (2006.01)
A23L 2/385 (2006.01)
A23L 2/56 (2006.01)
A23L 27/00 (2016.01)
A23L 27/20 (2016.01)
A23L 27/30 (2016.01)
A23L 29/00 (2016.01)
A23L 29/10 (2016.01)
A23L 29/231 (2016.01)
A23L 29/238 (2016.01)
A23L 29/25 (2016.01)
A23L 29/269 (2016.01)
C11B 9/00 (2006.01)
C12G 3/06 (2006.01)

(52) U.S. Cl.
CPC ............ A23D 7/01 (2013.01); A23D 7/005 (2013.01); A23J 7/00 (2013.01); A23L 2/385 (2013.01); A23L 2/56 (2013.01); A23L 27/2026 (2016.08); A23L 27/34 (2016.08); A23L 27/80 (2016.08); A23L 29/035 (2016.08); A23L 29/10 (2016.08); A23L 29/231 (2016.08); A23L 29/238 (2016.08); A23L 29/25 (2016.08); A23L 29/27 (2016.08); C11B 9/00 (2013.01); C12G 3/06 (2013.01); A23V 2002/00 (2013.01); A23V 2250/1842 (2013.01); A23V 2250/1846 (2013.01); A23V 2250/5022 (2013.01); A23V 2250/506 (2013.01); A23V 2250/5072 (2013.01); A23V 2250/5086 (2013.01); A23V 2250/6402 (2013.01); A23V 2250/6412 (2013.01); A23V 2250/6418 (2013.01); A23V 2250/642 (2013.01); A23V 2250/6422 (2013.01)

(58) Field of Classification Search
CPC ...... A23L 27/80; A23L 27/2026; A23L 27/34; A23L 29/127; A23L 29/035; A23L 29/10; A23L 29/231; A23L 29/238; A23L 29/27; A23L 2/54; A23L 2/56; A23L 2/385; A23L 29/25; A23D 7/005; A23D 7/01; A23D 7/00; A23J 7/00; A23V 2002/00; C11B 9/00; C12G 3/06
USPC ........................................................ 426/577
See application file for complete search history.

(56) References Cited

U.S. PATENT DOCUMENTS 3,291,614 A * 12/1966 Tumerman ............. A23G 9/327
426/99
5,716,814 A 2/1998 Yesair
(Continued)

FOREIGN PATENT DOCUMENTS

EP 0680699 A1 11/1995

OTHER PUBLICATIONS

NPL "Nephelometric Unit" [Retrieved on Jan. 15, 2021]. (Year: 2020).*

(Continued)

Primary Examiner — Bhaskar Mukhopadhyay

(57) ABSTRACT

A metastable, translucent flavor nanoemulsion is provided. The nanoemulsion contains a flavor oil phase, an aqueous phase, and a surfactant system containing a first lecithin and a second lecithin. The nanoemulsion is free of any non-natural surfactant. The surfactant system contains free fatty acid 15% or less. The first lecithin has an HLB of 1 to 8, and the second lecithin has an HLB of 8 to 16 and contains phosphatidylcholine and lysophosphatidylcholine 20% or greater. Also disclosed are a method for preparing the nanoemulsion and use of the nanoemulsion in liquid beverages and liquid beverage concentrates.

17 Claims, No Drawings

(56) References Cited

U.S. PATENT DOCUMENTS

| | | | | |
|---|---|---|---|---|
| 6,068,997 | A * | 5/2000 | Sas | C12P 13/00 |
| | | | | 435/106 |
| 2007/0085058 | A1 * | 4/2007 | Mora-Gutierrez | A61K 8/738 |
| | | | | 252/400.21 |
| 2007/0087104 | A1 | 4/2007 | Chanamai | |
| 2009/0285952 | A1 * | 11/2009 | Sekikawa | A23L 2/52 |
| | | | | 426/651 |
| 2010/0136175 | A1 * | 6/2010 | Skiff | A23L 2/38 |
| | | | | 426/72 |
| 2010/0305218 | A1 | 12/2010 | Wooster et al. | |
| 2011/0219983 | A1 * | 9/2011 | Baseeth | B01F 17/0085 |
| | | | | 106/31.75 |
| 2011/0236364 | A1 * | 9/2011 | Bromley | A23L 2/52 |
| | | | | 424/94.1 |
| 2011/0275592 | A1 | 11/2011 | Tanisaka | |
| 2013/0004621 | A1 * | 1/2013 | Schrader | A23D 9/00 |
| | | | | 426/73 |
| 2013/0064954 | A1 * | 3/2013 | Ochomogo | A23L 2/56 |
| | | | | 426/589 |
| 2014/0120209 | A1 * | 5/2014 | Bezelgues | C12P 7/6481 |
| | | | | 426/7 |

OTHER PUBLICATIONS

NPL Lecithins (2000-2003) http://americanlecithin.com/leci_appfood.html) ) (Year: 2003).*

NPL ALC LPC 20 (Retrieved on Feb. 21, 2022). (Year: 2022).*

NPL Estiasih T et al. (International Food Research Journal 20(2): 843-849 (2013) (Year: 2013).*

Google search result (Found USPN 6068997 from this search) (Retrieved on May 12, 2023. (Year: 2023).*

Estiasih, T., et al. (2013) "Modification of soy crude lecithin by partial enzymatic hydrolysis using phosholipase A1," International Food Research Journal 20(2):843-849.

Extended European Search Report dated Apr. 25, 2018 for EP 15852223.5.

International Preliminary Report on Patentability in PCT/US2015/56396 dated Apr. 25, 2017.

International Search Report and Written Opinion in PCT/US2015/56396 dated Jan. 6, 2016.

Rao, J., et al. (2013) "Optimization of lipid nanoparticle formation for beverage applications: Influence of oil type, cosolvents, and cosurfactants on nanoemulsion properties," Journal of Food Engineering 118(2):198-204.

* cited by examiner

METASTABLE, TRANSLUCENT FLAVOR NANOEMULSION AND METHODS OF PREPARING THE SAME

CROSS REFERENCE TO RELATED APPLICATIONS

This application is a national stage entry under 35 USC 371 for International Application No. PCT/U.S. 2015/056396, filed on Oct. 30, 2015. The international application claims the benefit of priority from two U.S. Applications Ser. Nos. (i) 62/065,865, filed on Oct. 20, 2014 and (ii) 62/197,919, filed on Jul. 28, 2015. The contents of both applications are incorporated by reference in their entirety.

BACKGROUND

Many flavoring compounds in beverage preparation are essential oils such as orange, lemon, and grapefruit or relatively nonpolar mixtures with limited water solubility.

To create optically clear or transparent beverages containing flavor oils, nanoemulsions (mean particle size in the range from 0.1 to 500 nanometers in diameter) are prepared using water and non-aqueous co-solvents such as propylene glycol, glycerin, or ethanol. These nanoemulsions need to be visually translucent and also metastable so that beverages prepared from them are clear and the oil phase contained therein does not separate from the aqueous phase.

The following patents and applications describe food compositions containing micro- or nano-emulsions: WO 2007/026271, JP 2006-249037, U.S. 2010/0136175, U.S. Pat. No. 6,902,756, U.S. 2013/0004621, U.S. 2009/0285952, U.S. Pat. No. 6,716,473, and U.S. 2007/0087104.

Synthetic, non-natural surfactants are often used to prepare stable nanoemulsions. Consumers nowadays desire beverages containing only natural products.

There is a need to produce flavored nanoemulsions for liquid beverage concentrates and ready-to-drink beverages using only natural surfactants.

SUMMARY

The present invention is based on the discovery that certain nanoemulsions containing only natural surfactants such as lecithins showed, unexpectedly, stable, translucent, and suitable for preparing clear beverages.

Accordingly, one aspect of this invention relates to a metastable, translucent flavor nanoemulsion that contains a flavor oil phase, an aqueous phase, and a surfactant system having a first lecithin and a second lecithin. The nanoemulsion is free of any non-natural surfactant. The surfactant system contains free fatty acids 15% or less (e.g., 10% or less and 5% or less) by weight of the surfactant system. The first lecithin has an Hydrophilic Lipophilic Balance ("HLB") of 1 to 8, and the second lecithin has an HLB of 8 to 16 and contains phosphatidylcholine and lysophosphatidylcholine 20% or greater (e.g., 30% or greater, 20% to 90%, and 30% to 90%) by weight of the second lecithin.

This nanoemulsion typically contains the surfactant system 0.1% to 10% and the flavor oil 1% to 20% by weight of the nanoemulsion. The ratio between the surfactant system and the flavor oil can be 1:10 to 2:1 (preferably, 1:5 to 1:1).

In the surfactant system, each of the first and second lecithins can be native, deoiled, fractionated, or enzyme-modified and selected from the group consisting of a soybean lecithin, an egg lecithin, a sunflower lecithin, a rapeseed lecithin, and a combination thereof. In some embodiments, the first lecithin is an enzyme-modified lecithin, and the second lecithin is a deoiled, fractionated, and enzyme-modified lecithin containing 15% or more lysophosphatidylcholine. Phosphatidylcholine is present in both the first and the second lecithins. In the surfactant system, phosphatidylcholine and lysophosphatidyl-choline can be present at a weight ratio of 4:1 to 1:5 (preferably, 1:1 to 1:4).

In some embodiments, the surfactant system further contains a third lecithin. The weight ratio between the first, second, and third lecithins is 1:20:2 to 1:5:1. In certain embodiments, the flavor oil phase contains an oil-soluble vitamin, an oil-soluble colorant, an antioxidant, or a combination thereof The nanoemulsion can further contain a co-solvent such as polyol in the aqueous phase. It can also contain a monosaccharide, a disaccharide, a hydrocolloid, or a combination thereof. Examples of the polyols include propylene glycol, 1.3-propanediol, glycerin, butylene glycol, erythritol, xylitol, mannitol, sorbitol, isomalt, and a combination thereof; suitable monosaccharides include glucose, fructose, and a combination thereof; disaccharides can be sucrose, maltose, or a combination thereof; and examples of hydrocolloids include xanthan gum, guar gum, gum arabic, chemically modified gum arabic, pectin, and a combination thereof In some embodiments, the co-solvent is a mixture of propylene glycol, glycerin, and sorbitol. In other embodiments, propylene glycol is present at a level of 5 to 25%, glycerin is present at a level of 0.1 to 35%, and sorbitol is present at a level of 25 to 65%, all by weight of the nanoemulsion. The weight ratio between water and the co-solvent is 1:95 to 1:3, preferably 1:40 to 1:4, and more preferably 1:20 to 1:5.

Another aspect of this invention relates to a liquid beverage or liquid beverage concentrate containing any above-described nanoemulsion.

Also within the scope of this invention is a method for preparing a metastable, translucent flavor nanoemulsion. The method includes the step of emulsifying a flavor oil into an aqueous phase in the presence of a surfactant system, in which the surfactant system containing a first lecithin and a second lecithin. The nanoemulsion is free of any non-natural surfactant, the first lecithin has an HLB of 1 to 8, and the second lecithin has an HLB of 8 to 16 and contains phosphatidylcholine and lysophosphatidylcholine 20% or greater by weight of the second lecithin.

The details of one or more embodiments of the invention are set forth in the description below. Other features, objects, and advantages of the invention will be apparent from the description and the claims.

DETAILED DESCRIPTION

It has been surprisingly found that a metastable, translucent flavor nanoemulsion composed of oil and water can be prepared by a phospholipid-based surfactant system in the absence of a synthetic or non-natural co-surfactant (e.g., sugar esters of fatty acids and polyglycerin fatty acid ester, both of which are synthesized from either sugar or polyglycerol and fatty acid). In addition to providing superior water dispersibility, flavor nanoemulsion compositions prepared according to this invention deliver a high product yield (e.g., 90% or greater and 95% or greater) and a comparable organoleptic flavor performance to current commercial nanoemulsion flavor systems. Further, sensory performance data, as demonstrated in the examples herein, showed no significant differences between conventional sucrose monopalmitate-based emulsions and the lecithin-based nanoemulsion of this invention. Note that sucrose monopalmitate is a synthetic surfactant for stabilizing acidic beverages. See Choi et al., *Food Research International*, 44(9), 3006-12 (2011).

Accordingly, the metastable, translucent flavor nanoemulsions of this invention are free of any non-natural surfactant and include a flavor oil phase, an aqueous phase, and a surfactant system. The surfactant system contains a first lecithin and a second lecithin, both of which are natural phospholipids.

A natural product or surfactant refers to a product that is naturally occurring and comes from a nature source. Natural products/surfactants include their derivatives which can be salted, desalted, deoiled, fractionated, or modified using a natural enzyme or microorganism. On the other hand, a non-natural surfactant is a chemically synthesized surfactant by a chemical process that does not involve an enzymatic modification.

For the purpose of this invention, stability is defined as a flavor quality and intensity that remains acceptable for use in end use applications. Preferably, a metastable composition has a shelf-life of at least 1 year to three years at room temperature in a glass or plastic container.

A translucent nanoemulsion refers to a nanoemulsion that can be seen through, although the light may be diffused by the material itself. In this respect, the nanoemulsion of the present invention provides a clear soft drink beverage. The term translucent refers to a nanoemulsion having a turbidity of less than 800 Nephelometric Turbidity Units ("NTU;" e.g., less than 200 NTU and less than 100 NTU). The term clear refers to a matter having a turbidity of less than 10 NTU (e.g., 5 NTU or less and 3 NTU or less). Turbidity can be measured following the procedures well known in the art, e.g., Fernandez et al., *Food Chemistry* (2000), 71, 563-66; and Christensen et al., *Journal—American Water Works Association* (2003), 95, 179-189.

A nanoemulsion refers to lipid droplets in size of 200 nanometers or less (e.g., 20 to 150 nanometers) in diameter. See Mason et al. 2006, *J. Physics: Condensed Matter* 18, 635-66. Nanoemulsions are produced by mixing a water-immiscible oil phase into an aqueous phase with a high-stress mechanical process.

Flavor oils suitable for preparing the nanoemulsions of this invention contain one or more volatile compounds. A variety of flavors can be used in accordance with the present invention. Flavors may be chosen from synthetic flavors, flavoring oils and oil extracts derived from plants, leaves, flowers, fruits, and combinations thereof. Representative flavor oils include, but are not limited to, spearmint oil, cinnamon oil, peppermint oil, clove oil, bay oil, thyme oil, cedar leaf oil, oil of nutmeg, oil of sage, and oil of bitter almonds. Also useful are artificial, natural or synthetic fruit flavors such as vanilla, chocolate, coffee, cocoa and citrus oil, including lemon, orange, grape, lime and grapefruit, and fruit essences including apple, pear, peach, strawberry, watermelon, raspberry, cherry, plum, pineapple, apricot and so forth. These flavors can be used individually or in admixture.

Volatile compounds in the flavor oils may include, but are not limited to, acetaldehyde, dimethyl sulfide, ethyl acetate, ethyl propionate, methyl butyrate, and ethyl butyrate. Flavors containing volatile aldehydes or esters include, e.g., cinnamyl acetate, cinnamaldehyde, citral, diethylacetal, dihydrocarvyl acetate, eugenyl formate, and p-methylanisole. Further examples of volatile compounds that may be present in the flavor oils include acetaldehyde (apple); benzaldehyde (cherry, almond); cinnamic aldehyde (cinnamon); citral, i.e., alpha citral (lemon, lime); neral, i.e., beta citral (lemon, lime); decanal (orange, lemon); ethyl vanillin (vanilla, cream); heliotropine, i.e., piperonal (vanilla, cream); vanillin (vanilla, cream); alpha-amyl cinnamaldehyde (spicy fruity flavors); butyraldehyde (butter, cheese); valeraldehyde (butter, cheese); citronellal (modifies, many types); decanal (citrus fruits); aldehyde C-8 (citrus fruits); aldehyde C-9 (citrus fruits); aldehyde C-12 (citrus fruits); 2-ethyl butyraldehyde (berry fruits); hexenal, i.e., trans-2 (berry fruits); tolyl aldehyde (cherry, almond); veratraldehyde (vanilla); 2,6-dimethyl-5-heptenal, i.e., melonal (melon); 2-6-dimethyloctanal (green fruit); and 2-dodecenal (citrus, mandarin); cherry; or grape and mixtures thereof. The composition may also contain taste modulators and artificial sweeteners.

The physical, chemical, and odor properties of selected volatile compounds are presented in Table 1.

TABLE 1

| Compound | MW (g/mol) | Boiling Point (° C.) | Water Solubility (g/L, approx.) | Odor Descriptors* |
|---|---|---|---|---|
| acetaldehyde | 44.05 | 21 | soluble | pungent; ethereal |
| dimethyl sulfide | 62.02 | 36 | insoluble | cabbage |
| ethyl acetate | 88.11 | 77 | 90 | ethereal; fruity |
| ethyl propionate | 102.13 | 99 | 14 | sweet; fruity; ethereal |
| methyl butyrate | 102.13 | 102 | 15 | fruity; pineapple |
| ethyl butyrate | 116.16 | 121 | 6 | fruity; pineapple |

*The Good Scents Company and Merck Index, 12$^{th}$ Ed.

In general, the flavor nanoemulsion of the invention contains a flavor oil 20% or less. In certain embodiments, the flavor nanoemulsion contains a flavor oil between 0.1% to 10%. In other embodiments, the flavor nanoemulsion contains a flavor oil between 1% to 5%.

In addition to flavor oil, the flavor nanoemulsion includes a surfactant system composed of a first lecithin and a second lecithin. In some embodiments, a third lecithin is included, which can have an HLB of 1 to 16. Typically, the lecithins are used in the absence of any non-natural co-surfactants (e.g., a sugar ester of a fatty acid, a glycerol fatty acid ester, a polyglycerol fatty acid ester, a polysorbate, or short-chain alcohol). The lecithins may be deoiled (i.e., having 3% or less residual oil), fractionated (i.e., separating soluble components and insoluble components in a solvent, which can be an alcohol such as ethanol or an ethanol-water mixture), or enzyme modified (i.e., enzymatic hydrolysis of phospholipids, resulting in a higher polarity of the phospholipid molecules thereby enhancing lecithin's water solubility). In certain embodiments, the first lecithin is a native lecithin (e.g., standard fluid lecithin), which has not been deoiled and enzymatically modified. In other embodiments, the first lecithin is an enzyme-modified lecithin. It can also be fractionated and/or deoiled. The first lecithin has an HLB value in the range of from 1 to 8, preferably in the range of from 4 to 8. The second lecithin can be deoiled, fractionated, and/or enzymatically modified and have an HLB value in the range of from 8 to 16, preferably from 12 to 15. The weight ratio of the first and second lecithins can be 1:30 to 10:1 (preferably, 1:20 to 5:1; more preferably, 1:10 to 1:1; and even more preferably, 1:10 to 1:3.5). The total amount of free fatty acids in the surfactant system is controlled at a level of 15% or less. Not to be bound by any theory, free fatty acids decrease the clarity of the metastable, translucent flavor nanoemulsions and final beverage products.

The term "HLB," as used herein, refers to the "hydrophilic-lipophilic balance" of a molecule. The HLB number indicates the polarity of the molecules in a range of 1-40, with the most commonly used emulsifiers having a value between 1 and 20. The HLB number increases with increasing hydrophilicity. The HLB of a surfactant can be determined by calculating values for the different regions of the molecule, as described by Griffin, "Classification of Surface-Active Agents by 'HLB,'" *Journal of the Society of Cosmetic Chemists* 1 (1949), 311-26; and Griffin, "Calculation of HLB Values of Non-Ionic Surfactants," *Journal of the Society of Cosmetic Chemists* 5 (1954), 249-56.

The term "free fatty acid" refers to the fatty acid containing a free carboxyl group (—COOH). Free fatty acids include their salts and solvates.

When a third lecithin is used, the weight ratio between the first, second, and third lecithins can be 1:20:2 to 1:5:1. It has been unexpectedly found that the nanoemulsion is metastable, translucent when prepared from the above-described lecithins within the above ranges without the need to add a non-natural surfactant.

Preferably, the lecithins used in the nanoemulsion of the present invention are food-grade or GRAS (generally recognized as safe). Examples of commercially available lecithins include but are not limited to egg lecithins, soy phospholipids, and 99% pure egg or soy phosphatidylcholine. In other embodiments, the lecithins have been enzyme modified to create lyso-lecithins.

Lecithins are mixtures of two primary components, namely phospholipids and triglycerides, with minor amounts of other constituents such as phytoglycolipids, phytosterols, tocopherols, and free fatty acids. Phospholipids in lecithin include phosphatidylcholine, phosphatidylethanolamine, phosphatidylinositol, phosphatidic acid. In certain embodiments, the level of phosphatidylcholine in the lecithin is in the range of from 5 to 80%, preferably 40 to 80%, or more preferably 50 to 80%. The term "lecithin" as used herein refers to a single type of lecithin (e.g., de-oiled or fractionated or enzyme modified) as well as to a mixture of lecithins. Lecithins are prepared by extracting and purifying phospholipids from naturally occurring products including, but not limited to, soybean, egg, sunflower or rapeseed (canola) seed.

Food-grade lecithins are available in liquid, granular or powder from commercial sources and include, e.g., ALCOLEC Lecithins sold by American Lecithin Company (Oxford, CT) and TOPCITHIN, LECIPRIME, LECISOY, EMULFLUID, METARIN, EMULPUR, LECIGRAN, EPIKURON, LECIMULTHIN, EMULTOP, and OVOTHIN Lecithins sold by CARGILL (Mechelen, Belgium), and SOLEC Lecithins sold by DuPont Nutrition & Health (St. Louis, MO).

In general, the flavor nanoemulsion of the invention contains the surfactant system between 0.1% and 20%. In other embodiments, the flavor nanoemulsion of the invention contains the surfactant system between 0.1% and 10%. Preferably, the flavor nanoemulsion includes the first lecithin between 1% and 10% and the second lecithin between 0.1% and 10%. The amount of lecithin employed may be dependent upon the property and level of flavor oil required by the formulation, as well as the desired organoleptic and clarity performance of the nanoemulsion.

In accordance with the present invention, the flavor oil phase is emulsified into the aqueous phase, which can constitute 65% to 99% by weight of the nanoemulsion. The aqueous phase can have 30% to 95% (e.g., 50% to 95% and 70% and 95%) a co-solvent such as glycerin, propylene glycol, glycerol, and/or ethanol. Sugar alcohols can also be added to the aqueous phase as a co-solvent. Examples of sugar alcohols include sorbitol, mannitol, xylitol, lactitol, maltitol, erythritol, and a combination thereof. In a particular embodiment, a combination of water and at least one of propylene glycol, glycerin and sugar alcohol are used in the nanoemulsion composition. It is possible to use propylene glycol and sugar alcohol, propylene glycol and glycerin, glycerin and sugar alcohol, or all three together as the co-solvent. The weight ratio between water and the co-solvent is typically 1:95 to 1:4 (e.g., 1:20 to 1:5).

In certain embodiments, the aqueous phase further contains 0.01% to 20% a carrier material including mono- and di-saccharide sugars such as glucose, lactose, levulose, trehalose, fructose, maltose, ribose, sucrose, or a combination thereof. In other embodiments, the aqueous phase further contains a protein, gum, and/or hydrocolloid. Suitable proteins include soy protein isolate, soy protein concentrate, whey protein isolate, whey protein concentrate, gelatin, pea protein, and protein hydrolysates. Example of gums and hydrocolloids include xanthan gum, guar gum, gum acacia, chemically modified gum acacia, pectin, and alginate.

Flavor nanoemulsions of the present invention are prepared by emulsifying the flavor oil into the aqueous phase in the presence of lecithins using conventional techniques. Briefly, nanoemulsions are typically prepared by mixing the aqueous and oil phases, and subjecting the mixture to homogenization several times, or, in the terminology of the art, to make more than one "pass." In accordance with the present invention, a pre-emulsion step (i.e., a high shear mixing step) is critical to set the initial particle size prior to high-pressure homogenization. The speed of high shear mixing may range from 3,000 rpm to 20,000 rpm and the time of mixing may range from 5 to 30 minutes. A high-pressure homogenizer (e.g., commercially available Niro Panda 2000) or other type of homogenizer (e.g., MICROFLUIDIZER commercially available from Microfluidics or EMULSIFLEX commercially available from Avestin) is subsequently used to prepare the nanoemulsion. Homogenization can be carried out at 3,000/300 psi to 10,000/1,000 psi using a two-stage homogenizer for two, three, or more passes; or 6,500/500 psi to 20,000/2,000 psi for one, two or more passes.

The instant metastable, translucent flavor nanoemulsion can be used in a variety of consumer, food, or pharmaceutical products. In particular, the metastable, translucent flavor nanoemulsion finds application in gums, confections, oral care products, beverages, snacks, dairy products, soups, sauces, condiments, detergents, fabric softeners and other fabric care products, antiperspirants, deodorants, talc, kitty litter, hair care and styling products, personal care products, air fresheners, cereals, baked goods and cleaners.

In specific embodiments, the instant metastable, translucent flavor nanoemulsion is used in beverages and clear beverage liquid concentrates. Accordingly, in addition to metastable, translucent flavor nanoemulsions, the present invention also provides optically clear final beverage products or liquid beverage concentrates containing the metastable, translucent flavor nanoemulsion of the invention.

In some embodiments, the instant metastable, translucent flavor emulsion is dosed at a level between 1 ppm to 60% (e.g., 1 ppm to 20% and 5 ppm to 5%) by weight of the final beverage product so that the product contains a flavor oil 0.01 ppm to 10% (0.1 ppm to 5%, 0.5 ppm to 1%, and 1 ppm to 100 ppm). Using the flavor emulsion of this invention, the final beverage product thus prepared is clear, having a turbidity of 10 Nephelometric Turbidity Units ("NTU") or below.

As used herein, the term "liquid beverage concentrate" means a liquid composition that can be diluted with another liquid, such as an aqueous, potable liquid to provide a final beverage or added to a food product prior to being consumed. The phrase "liquid" refers to a non-gaseous, flowable, fluid composition at room temperature (i.e., 70° F.). The term "final beverage" as used herein means a beverage that has been prepared either by the standard soft drink (i.e., ready-to-drink) preparation procedure or by diluting the concentrate to provide a beverage in a potable, consumable form. In some aspects, the concentrate is non-potable due to acidulant content and/or flavor intensity. By way of example to clarify the term "concentration," a concentration of 75 times (i.e., "75X") would be equivalent to 1 part concentrate to 74 parts water (or other potable liquid) to provide the final beverage. In other words, the flavor profile of the final beverage is taken into account when determining an appropriate level of dilution, and thus concentration, of the liquid beverage concentrate. The dilution factor of the concentrate can also be expressed as the amount necessary to provide a single serving of concentrate.

The terms "nanoemulsion" and "emulsion" are used herein interchangeably.

The viscosity, pH, and formulations of the concentrates will depend, at least in part, on the intended dilution factor. In one approach, a moderately concentrated product may be formulated to be diluted by a factor of at least 5 times to provide a final beverage, which can be, for example, an 8 ounce beverage. In one aspect, the concentrate is formulated to be diluted by a factor of 5 to 15 times to provide a final beverage. In this form, the liquid concentrate has a pH of 1.8 to 4, or more particularly, 1.8 to 2.9, 2 to 3.1, or 2 to 2.5; and a viscosity of 7.5 to 100 cP, 10 to 100 cP, 15 to 100 cP, 10 to 50 cP, or 10 to 20 cP, as measured using Spindle S00 at 50 rpm and 20° C. with a Brookfield DVII+Pro Viscometer. In some embodiments, the concentrate includes at least 0.1 to 15 percent acidulant by weight of the concentrate. Any edible, food grade organic or inorganic acid, such as, but not limited to, citric acid, malic acid, succinic acid, acetic acid, hydrochloric acid, adipic acid, tartaric acid, fumaric acid, phosphoric acid, lactic acid, sodium acid pyrophosphate, salts thereof, and combinations thereof can be used, if desired. The selection of the acidulant may depend, at least in part, on the desired pH of the concentrate and/or taste imparted by the acidulant to the diluted final beverage. In another aspect, the amount of acidulant included in the concentrate may depend on the strength of the acid. For example, a larger quantity of lactic acid would be needed in the concentrate to reduce the pH in the final beverage than a stronger acid, such as phosphoric acid. In some embodiments, a buffer can be added to the concentrate to provide for increased acid content at a desired pH. Suitable buffers include, for example, a conjugated base of an acid, gluconate, acetate, phosphate or any salt of an acid (e.g., sodium citrate and potassium citrate). In other instances, an undissociated salt of the acid can buffer the concentrate.

The beverages or concentrates of the invention can include one or more juices or juice concentrates (such as at least a 4× concentrated product) from fruits or vegetables for bulk solid addition. In one aspect, the juice or juice concentrate may include, for example, coconut juice (also commonly referred to as coconut water), apple, pear, grape, orange, potato, tangerine, lemon, lime, tomato, carrot, beet, asparagus, celery, kale, spinach, pumpkin, strawberry, raspberry, banana, blueberry, mango, passionfruit, peach, plum, papaya, and combinations. The juice or juice concentrates may also be added as a puree, if desired.

As indicated, concentrates can be added to potable liquids to form flavored beverages. In some aspects, the concentrate may be non-potable (such as due to the high acid content and intensity of flavor). For example, the beverage concentrate can be used to provide flavor to water, cola, carbonated water, tea, coffee, seltzer, club soda, the like, and can also be used to enhance the flavor of juice. In one embodiment, the beverage concentrate can be used to provide flavor to alcoholic beverages, including but not limited to flavored champagne, sparkling wine, wine spritzer, cocktail, martini, or the like. In particular embodiments, the concentrate is used in an optically clear beverage.

Beverage concentrates can also be combined with a variety of food products to add flavor to the food products. For example, concentrates can be used to provide flavor to a variety of solid, semi-solid, and liquid food products, including but not limited to oatmeal, cereal, yogurt, strained yogurt, cottage cheese, cream cheese, frosting, salad dressing, sauce, and desserts such as ice cream, sherbet, sorbet, and Italian ice. Appropriate ratios of the beverage concentrate to food product or beverage can readily be determined by one of ordinary skill in the art.

Other modifications of this invention will be readily apparent to those skilled in the art. Such modifications are understood to be within the scope of this invention. In addition, all parts, percentages, proportions, and ratios typically refer to herein and in the claims are by weight unless otherwise specified.

The values and dimensions disclosed herein are not to be understood as being strictly limited to the exact numerical values recited. Instead, unless otherwise specified, each such value is intended to mean both the recited value and a functionally equivalent range surrounding that value. For example, a value disclosed as "50%" is intended to mean "about 50%."

All publications cited herein are incorporated by reference in their entirety.

The invention is described in greater detail by the following non-limiting examples.

Examples 1-2

Preparation of Nanoemulsions Containing Two Lecithins

Two nanoemulsions of this invention, i.e., Samples A and B, were prepared using the following procedure.

Preparation of Oil and Aqueous Phases. To prepare the oil phase, 6 grams of standard fluid lecithin (GIRALEC, commercially available from Lasenor, Barcelona, Spain; HLB of 4) was combined with 30 grams of lime flavor oil (International Flavors and Frances, Union Beach, NJ) under mixing until homogenously dissolved. To prepare the aqueous phase, 600 grams of 70% sorbitol aqueous solution, 254 grams of glycerin, and 100 grams of propylene glycol were combined in a separate container under mixing using an overhead mixer until homogenous. Ten grams of fractionated lecithin (ALCOLEC PC 50 from American Lecithin Company, Oxford, CT; HLB of 8; deoiled, containing 50% phosphatidylcholine) was gradually added into the aqueous phase until fully dissolved under high shear mixing using the Silverson high shear mixer, Model L4RT, (SILVERSON) at 6,500 rpm for 5 minutes.

Formation of Translucent Emulsion. Pre-emulsion was formed by mixing the oil phase and aqueous phase prepared above under high shear mixing using the Silverson high shear mixer, Model L4RT, at 6,500 rpm for 3 minutes. The pre-emulsion was further processed in a high-pressure Niro Panda 2000 homogenizer (Niro Soavi, Hudson, Wisc.) for three passes at 7,000/700 psi. The sample produced according to this Example was known as "Sample A" for use in Examples 5 and 6. Particle size of the emulsion was measured by the Malvern Zetasizer (Malvern Instruments Ltd, Worcestershire, UK). The emulsion was diluted at 1 wt % in water for the particle size measurement.

Sample B was prepared following the same procedure described above except that 6 grams of SOLEC K-EML lyso-lecithin (HLB of 8) was used instead of the standard lecithin and 20 grams of ALCOLEC C LPC20 deoiled lyso-lecithin (HLB of 12) was used instead of 10 grams of ALCOLEC PC50.

Examples 3-4

Preparation of Clear Emulsions Containing Three Lecithins

Preparation of Oil and Aqueous Phases. To prepare the oil phase, 3 grams of standard liquid lecithin (GIRALEC, commercially available from Lasenor, Barcelona, Spain; HLB of 4) was combined with 30 grams of lime flavor oil (International Flavors and Frances, Union Beach, NJ) under mixing until homogenously dissolved. To prepare the aqueous phase, 600 grams of 70% sorbitol aqueous solution, 254 grams of glycerin, and 100 grams of propylene glycol were combined in a separate container under mixing using an overhead mixer until homogenous. Ten grams of fractionated lecithin (ALCOLEC PC 50) from American Lecithin Company (Oxford, CT, USA) and 3 grams of EMULPUR SF standard de-oiled lecithin from Cargill (Decatur, IL; HLB of 7) was gradually added into the aqueous phase until fully dissolved under high shear mixing using the Silverson high shear mixer, Model L4RT, (SILVERSON) at 6,500 rpm for 5 minutes.

Formation of Translucent Emulsion. Pre-emulsion was formed by mixing the oil phase and aqueous phase prepared above under high shear mixing using the Silverson high shear mixer, Model L4RT, at 6,500 rpm for 3 minutes. The pre-emulsion was further processed in a high-pressure Niro Panda2000 homogenizer (Niro Soavi, Hudson, WI) for 3 passes at 7,000/700 psi. The sample produced according to this Example was known as "Sample C" for use in Examples 5 and 6. Particle size of the emulsion was measured by the Malvern Zetasizer (Malvern Instruments Ltd, Worcestershire, UK). The emulsion was diluted at 1 wt % in deionized water for the particle size measurement.

The ranges of processing parameters for both pre-emulsion step and the high-pressure homogenizer described in Examples 1-2 are also applicable to Examples 3-4.

Sample D was prepared with the same procedure described in the Example, except SOLEC K-EML lyso-lecithin was used in place of the same amount of standard lecithin and ALCOLEC C LPC20 deoiled lyso-lecithin was used in place of the same amount of ALCOLEC PC50.

Example 5

Characterization of Lecithin-Based Nanoemulsions

The degree of turbidity measurement was obtained using a turbidimeter with the unit of NTU specified by United States Environmental Protection Agency. For beverages having a NTU value above 15 would be considered hazy and not clear. A preferred range for a clear beverage is from 0.1 to 10, and more preferred range is from 0.1 to 5. Nanoemulsions A-D prepared in Examples 1-4 were applied to the final beverage according to the beverage formulation of TABLE 2.

TABLE 2

| Final Beverage | g/L |
|---|---|
| Nanoemulsion | 1 |
| Sugar syrup 67° Brix | 150 |
| Citric acid 50% solution | 3 |
| Water | q.s. to 1 L final |

Mean particle size of the four nanoemulsions, turbidity of microemulsions, turbidity of the final beverages are included in TABLE 3. All of the nanoemulsions were translucent. All final beverages were optically clear. Generally, a higher surfactant concentration leads to a smaller mean particle size which consequently resulting in a lower turbidity value of the final beverage shown in samples A and B. On the contrary, the choice of surfactants at the same concentration can lead into a different particle size and turbidity value of the final beverage shown in Samples C and D.

TABLE 3

| Characteristic | Sample A | Sample B | Sample C | Sample D |
|---|---|---|---|---|
| Mean Particle size (nm) | 137 | 90 | 140 | 94 |
| Turbidity (NTU) of nanoemulsion | 107 | 120 | 112 | 143 |
| Turbidity (NTU) of the final beverage | 10.1 | 2.8 | 8.4 | 4.1 |

Example 6

Sensory Performance of Lecithin-Based Nanoemulsions

To establish consumer benefit of the lecithin-based nanoemulsions, two flavor nanoemulsions (Samples A and C) prepared in Examples 1 and 3 were selected to compare with a reference sample (sucrose monopalmitate-based nanoemulsion) in the beverage prepared according to TABLE 2. An expert panel composed of 12 evaluators was used to rate the intensity of both lime aroma and flavor as well as off-odor and off-taste shown in TABLE 4. Statistical analysis showed no significant differences (p=0.05) between sucrose monopalmitate-based (control) and the lecithin-based nanoemulsions of this invention, indicating that the lecithin-based nanoemulsions are capable of delivering the full benefit of flavor quality and character, comparable to the conventional sucrose monopalmitate-base system, which contains non-natural, synthetic surfactant sucrose monopalmitate.

TABLE 4

| Sample | Lime Aroma Intensity | Off Odor Intensity | Lime Flavor Intensity | Off Taste Intensity |
|---|---|---|---|---|
| Reference System (Control) | 9.8 | 0.3 | 10.2 | 0.5 |
| Sample A | 9 | 0.1 | 9.6 | 0.9 |
| Sample C | 9.1 | 0.2 | 9.7 | 0.5 |

Examples 7-11

Preparation of Nanoemulsions with Different Ratios of Lecithins

Five nanoemulsions of this invention were prepared following a similar procedure described in Examples 1-2 above, except that different amounts of lecithins were used. See Table 5 below. The final beverages each containing a nanoemulsion were prepared according to the procedure described in Example 5. Their turbidities were measured. Unexpectedly, all final beverages were optically clear with a turbidity below 10. Turbidity value increases with an increasing ratio of the standard liquid lecithin to ALCOLEC C LPC20 (HLB=12; containing 20% or more lysophosphatidylcholine and 40% phosphatidylcholine+lysophosphatidylcholine) as well as an increasing ratio of phosphatidylcholine to lysophosphatidylcholine. See Tables 5 and 6.

TABLE 5

| | Sample | | | | |
|---|---|---|---|---|---|
| | Sample E | Sample F | Sample G | Sample H | Sample I |
| Weight (grams) of standard liquid lecithin | 2.4 | 6 | 13 | 20 | 23.6 |
| Weight (grams) of ALCOLEC C LPC20 | 23.6 | 20 | 13 | 6 | 2.4 |
| Turbidity (NTU) of the final beverage | 1.9 | 2.5 | 2.7 | 7 | 9.9 |

TABLE 6

| | Sample | | | | |
|---|---|---|---|---|---|
| | Sample E | Sample F | Sample G | Sample H | Sample I |
| Weight ratio of phosphatidylcholine to lysophosphatidylcholine | 0.8:1 | 0.9:1 | 1.4:1 | 2.3:1 | 3.3:1 |
| Turbidity of final beverages (NTU) | 1.9 | 2.5 | 2.7 | 7.0 | 9.9 |

Examples 12-15

Preparation of Nanoemulsions with Different Amounts of Lecithins

Four more nanoemulsions were prepared according to the procedure described in Examples 1-2, where the total weight of lecithins increases relatively to the constant weight of flavor (30 grams). See Table 7. Final beverages each containing a nanoemulsion were prepared according to the procedure described in Example 5, and the turbidity of beverages was measured. Except for Sample M which contains a high free fatty acid level in the surfactant system, results show that turbidity value of the final beverage decreases with an increasing level of total lecithin.

TABLE 7

| | Sample | | | |
|---|---|---|---|---|
| | Sample J | Sample K | Sample L | Sample M |
| Weight of standard liquid lecithin (grams) | 0.6 | 1.4 | 6 | 12 |
| Weight of ALCOLEC C LPC20 (grams) | 2 | 4 | 20 | 40 |
| Turbidity of final beverages (NTU) | 7.5 | 3.5 | 2.5 | 12.1 |

Examples 16-18

Preparation of Nanoemulsions Containing Different Amounts of Free Fatty Acids

Two additional nanoemulsions of this invention and a comparative nanoemulsion were prepared according to the procedure described in Examples 1-2, where 26 grams of different types of lecithins varying in the level of free fatty acids were used. Final beverages each containing a nanoemulsion were prepared according to the procedure described in Example 5. Their turbidities were measured. See Table 8. Samples N and O of this invention were prepared each using a surfactant system containing less than 10% free fatty acids. Comparative nanoemulsion was prepared using a surfactant system containing 28% free fatty acids. Unexpectedly, Samples N and O each have a turbidity of 6 or less, while Comparative P has a turbidity as high as 24 NTU, indicating non-clear.

TABLE 8

| | Sample | | |
|---|---|---|---|
| | Sample N | Sample O | Comparative P |
| Free fatty acids (%) | 6.9 | 9.8 | 28 |
| Turbidity (NTU) of final beverages | 5.3 | 6 | 24.1 |

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Indeed, to prepare a translucent, metastable flavor nanoemulsion, achieve the purpose of preparing a clear liquid beverage, one skilled in the art can design and prepare a nanoemulsion by using different flavors and lecithins, varying the concentrations of the flavors and lecithins to achieve desirable organoleptic or release profiles in a clear beverage or concentrate. Further, the ratios among the flavor, lecithins, and water can also be determined by a skilled artisan through assays known in the art to prepare nanoemulsions with desirable properties.

From the above description, a skilled artisan can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A translucent flavor nanoemulsion comprising:
a flavor oil phase,
an aqueous phase, and
a surfactant system comprising a first lecithin, a second lecithin, and free fatty acid being 10% or less by weight of the surfactant system,
the first lecithin having an HLB of 1 to 8,
the second lecithin having an HLB of 12 to 15 and comprising phosphatidylcholine and lysophosphatidylcholine 30% or greater by weight of the second lecithin, the phosphatidylcholine and lysophosphatidylcholine being at a weight ratio of 0.8:1 to 3.3:1,
the weight ratio between the first and second lecithins is 1:10 to 10:1,
wherein the nanoemulsion is free of any non-natural surfactant including sugar esters of fatty acids and polyglycerin fatty acid ester.

2. The translucent flavor nanoemulsion of claim 1, wherein the nanoemulsion comprises the surfactant system 0.1% to 20% by weight and the flavor oil 1% to 20% by weight.

3. The translucent flavor nanoemulsion of claim 1, wherein each of the first and second lecithins, being native, deoiled, fractionated, or enzyme-modified, is selected from the group consisting of a soybean lecithin, an egg lecithin, a sunflower lecithin, a rapeseed lecithin, and a combination thereof.

4. The translucent flavor nanoemulsion of claim 3, wherein the second lecithin is a deoiled, fractionated, and enzyme-modified lecithin comprising 15% or more lysophosphatidylcholine by weight and 9.8% or less free fatty acid by weight.

5. The translucent flavor nanoemulsion of claim 1, further comprising a polyol as a co-solvent in the aqueous phase, wherein the weight ratio between water and the co-solvent is 1:95 to 1:4.

6. The translucent flavor nanoemulsion of claim 5, wherein the polyol is propylene glycol, 1,3-propandiol, glycerin, butylene glycol, erythritol, xylitol, mannitol, sorbitol, isomalt, or a combination thereof.

7. The translucent flavor nanoemulsion of claim 1, further comprising in the aqueous phase a monosaccharide, a disaccharide, a hydrocolloid, or a combination thereof.

8. The translucent flavor nanoemulsion of claim 7, wherein the monosaccharide is glucose, fructose, or a combination thereof, the disaccharide is sucrose, maltose, or a combination thereof, and the hydrocolloid is xanthan gum, guar gum, gum arabic, chemically modified gum arabic, pectin, or a combination thereof.

9. The translucent flavor nanoemulsion of claim 1, wherein the flavor oil phase comprises an oil-soluble vitamin, an oil-soluble colorant, an antioxidant, or a combination thereof.

10. The translucent flavor nanoemulsion of claim 3, wherein the first lecithin is an enzyme-modified lecithin, and the second lecithin is a deoiled, fractionated, and enzyme-modified lecithin comprising 15% or more lysophosphatidylcholine by weight and 9.8% or less free fatty acid by weight.

11. The translucent flavor nanoemulsion of claim 10, further comprising in the aqueous phase a polyol, a monosaccharide, a disaccharide, a hydrocolloid, or a combination thereof, wherein the polyol is propylene glycol, 1,3-propandiol, glycerin, butylene glycol, erythritol, xylitol, mannitol, sorbitol, isomalt, or a combination thereof, the monosaccharide is glucose, fructose, or a combination thereof, the disaccharide is sucrose, maltose, or a combination thereof, and the hydrocolloid is xanthan gum, guar gum, gum acacia, chemically modified gum acacia, pectin, or a combination thereof.

12. The translucent flavor nanoemulsion of claim 11, wherein the nanoemulsion comprises the surfactant system 0.1% to 20% by weight and the flavor oil phase 1% to 20% by weight, and the flavor oil phase comprises an oil-soluble vitamin, an oil-soluble colorant, an antioxidant, or a combination thereof.

13. The translucent flavor nanoemulsion of claim 12, wherein the weight ratio of the surfactant system and the flavor oil is 1:10 to 2:1, and the surfactant system comprises free fatty acid 9.8% or less.

14. A liquid beverage or liquid beverage concentrate comprising the translucent flavor nanoemulsion of claim 1.

15. A method for preparing the translucent flavor nanoemulsion of claim 1,
the nanoemulsion being free of any non-natural surfactant including sugar esters of fatty acids and polyglycerin fatty acid ester,
the method comprising:
emulsifying the flavor oil into the aqueous phase in the presence of the surfactant system, wherein the surfactant system comprises the first lecithin and the second lecithin,
the first lecithin having the HLB of 1 to 8,
the second lecithin having the HLB of 12 to 15 and comprising the phosphatidylcholine and the lysophosphatidylcholine 30% or greater by weight of the second lecithin, the phosphatidylcholine and the lysophosphatidylcholine being at the weight ratio of 0.8:1 to 3.3:1, and
the weight ratio between the first and the second lecithins being 1:10 to 10:1, and the surfactant system comprising the free fatty acid 10% or less by weight of the surfactant system.

16. The translucent flavor nanoemulsion of claim 1, wherein the first lecithin has an HLB of 4 to 8.

17. The translucent flavor nanoemulsion of claim 1, wherein the nanoemulsion is used for preparing an optically clear beverage, wherein turbidity of the optically clear beverage is less than 10.0 Nephelometric Turbidity Units after applying the nanoemulsion to a beverage formulation.

* * * * *